June 4, 1929.  A. BAER  1,715,489
CRANK SHAFT
Filed June 9, 1926
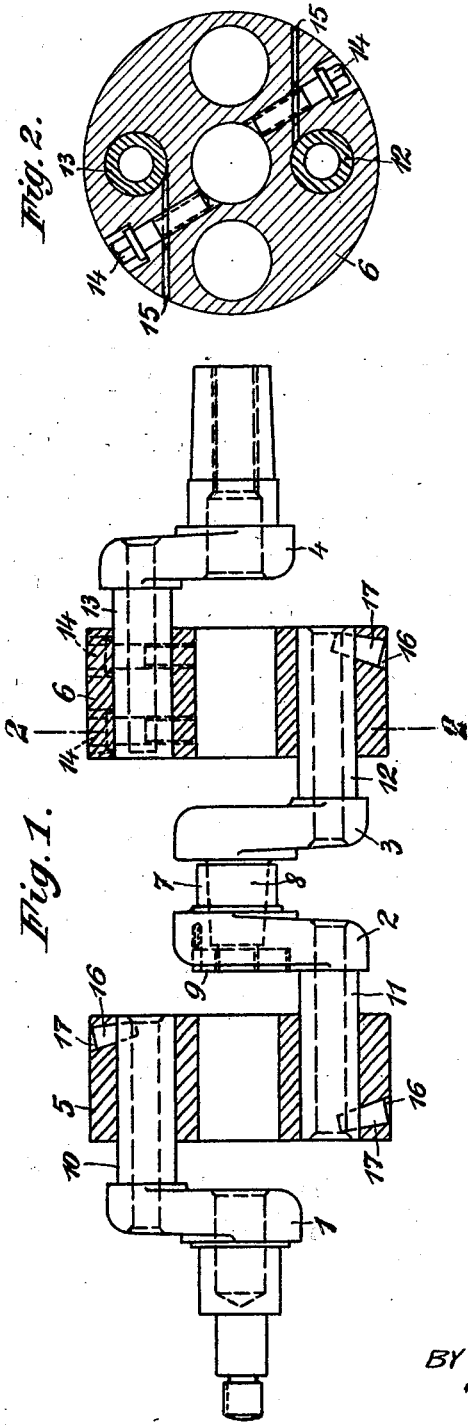
INVENTOR
ALFRED BAER
BY Richards & Geier
ATTORNEYS Patented June 4, 1929.

1,715,489

UNITED STATES PATENT OFFICE.

ALFRED BAER, OF BERLIN, GERMANY.

CRANK SHAFT.

Application filed June 9, 1926, Serial No. 114,593, and in Germany July 6, 1925.

This invention relates to crank-shafts, especially for combustion engines, which are composed of crank-arms and crank-pins. Such composite crank-shafts have the disadvantage that the connections between the crank-arms and the crank-pins are not of sufficient strength in order to warrant a sufficiently permanent and durable connection, which will meet the practical requirements. In constructions of this kind the slot and the connecting screw which serve for making the connection between the cranks and the pins are so arranged that a deformation of the bore of the crank will easily take place, when the connecting screw is drawn tight. In consequence thereof the crank pin will be gripped by the appertaining crank only on a part of its circumferential surface, while another part of the material of the crank will be caused to move away from the crank-pin and come out of proper contact therewith.

My present invention has for its object to do away with this disadvantage. According to my invention the said slots are arranged in tangential direction to the bore of the crank and more particularly in such a manner, that the orifice of said slot will be positioned about diametrically opposite to the point around which the material will be caused to be displaced when the connecting screw is being drawn tight. A further essential feature of my present invention consists therein, that the connecting screw is positioned obliquely to the said slot, so that the material of the crank will exert a force upon the crank-pin, which causes the former to be drawn around the latter in one direction only and much the same as if the former were pulled in the form of a ribbon around the latter. By reason of this the crank will be intimately laid against the crank-pin all over the circumference of the latter.

In the drawing I have represented an example of carrying my invention into effect. Fig. 1 is a longitudinal view, partly in section, of the novel crank-shaft according to my invention, and Fig. 2 is a section taken on line 2—2 of Fig. 1.

The crank-shaft according to my invention consists, essentially of the crank-arms 1, 2, 3 and 4 and the intermediate crank members 5 and 6. The crank-arms 2 and 3 are connected with the shaft part 7, by means of the conical part 8 and the nut 9.

The crank pins 10, 11, 12 and 13 are fixedly secured within cylindrical bores in the crank-members 5 and 6 by the use of bolts 14. For this purpose the cranks are provided with the slots 15, which are directed tangentially to the bores of the crank-pins 10, 11, 12 and 13. By properly arranging the connecting bolts 14, the material of the crank-members 5 and 6 adjacent the bores will be firmly drawn around and relative to the crank-pins 10 and 13 in one direction only, when drawing said bolts tight, so that the surface of the bores will firmly contact at all points with the surface of the crank-pins. The bores and pins are furthermore precisely ground so that a rotation of the crank-members around the crank pins will be made impossible.

The crank-shaft according to my invention is assembled and its arms 2 and 3 properly adjusted with respect to each other and firmly connected by drawing tight the nut 9. In doing this, care must be taken, that the pins 11 and 12 which are connected to these two cranks are in alignment with each other. Thereupon the crank-members 5 and 6 are loosely placed by means of their bores upon the respective crank-pins of the crank-arms 2 and 3, while the pins 10 and 13 of the cranks 1 and 4 respectively are introduced into the opposite bores. The ends of the crank-shaft are now mounted in any suitable manner in the crank casing (not shown). The cranks, which have not yet been fastened upon their pins, will be automatically brought into proper position. A greater accuracy in adjusting the several parts of the crank-shaft may be attained by rotating the latter several times, before having the connecting bolts 14 drawn tight. The latter may now be drawn tight and furthermore conically formed bores 16 are provided, which serve for the reception of the conical plugs or pins 17. These plugs or pins 17 have the sole purpose of facilitating the re-assembling of the crank-shaft after the same had been taken apart.

I claim:

1. A crank-shaft, especially for combustion engines, comprising crank-members and crank-pins, said crank-members having bores for the reception of said crank-pins, slots provided within said crank-members in a direction which is tangential to said bores, and tightening screws arranged obliquely to said slots for drawing the opposed surfaces thereof toward each other.

2. A crank-shaft, especially for combustion engines, comprising crank-members and crank-pins, said crank-members having bores for the reception of said crank-pins, slots provided within said crank-members tangentially to said bores and at a point of the latter which is diametrically opposite to the point around which the material of said crank-members will be displaced during compression of said slots, and compressive means for compressing said slots, said compressive means being adapted to act in a direction obliquely to said slots, so as to cause upon compression of said slots a displacement of the material of said crank-members following the circumference of said crank-pins, whereby an intimate contact of said crank-members and said crank-pins will be attained all over the circumference of the latter.

3. A crank-shaft including a crank-member having a bore and a slot extending tangentially with respect to said bore, a crank-pin in said bore, and means intersecting said slot for drawing the faces of said slot toward each other to thereby tighten said crank-member about said pin.

4. A crank-shaft having a bore and a slot communicating with said bore and extending tangentially therefrom to the periphery of said crank-member, a crank-pin in said bore, and means for drawing together the material of said crank-member at said slot to effect a uniform binding action of the wall of said bore upon the periphery of said pin.

5. A crank-shaft having a bore and a slot communicating with said bore and extending tangentially therefrom to the periphery of said crank-member, a crank-pin in said bore, and means intersecting said slot at an oblique angle thereto for drawing the faces of said slot toward each other to thereby tighten said crank-member about said pin.

In testimony whereof I have affixed my signature.

ALFRED BAER.